Figure 1:
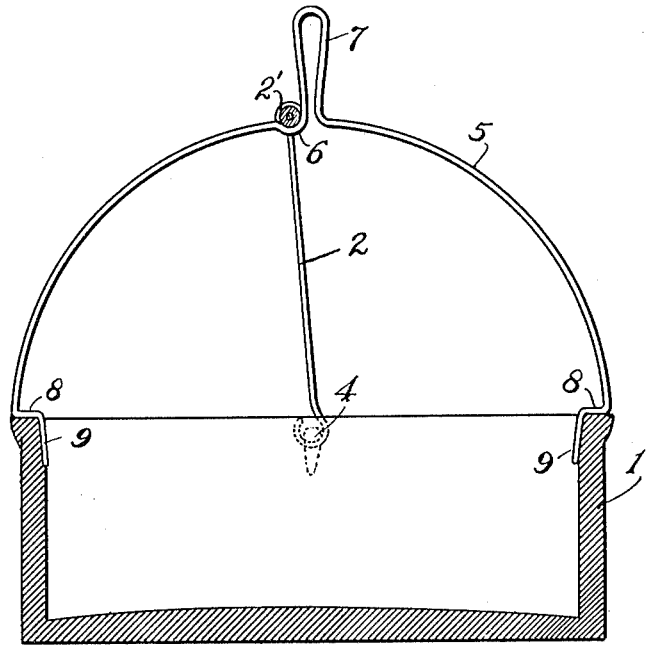

P. R. PARK.
FEED DISH GUARD.
APPLICATION FILED SEPT. 5, 1912.

1,079,261.

Patented Nov. 18, 1913.

WITNESSES
R. B. Ellms.
Victoria Lowden

INVENTOR
Philip R. Park
BY
ATTY.

UNITED STATES PATENT OFFICE.

PHILIP R. PARK, OF SOMERVILLE, MASSACHUSETTS, ASSIGNOR TO THE PARK & POLLARD COMPANY, A CORPORATION OF MASSACHUSETTS.

FEED-DISH GUARD.

1,079,261.

Specification of Letters Patent.

Patented Nov. 18, 1913.

Application filed September 5, 1912. Serial No. 718,752.

*To all whom it may concern:*

Be it known that I, PHILIP R. PARK, a citizen of the United States, residing at Somerville, county of Middlesex, Commonwealth of Massachusetts, have invented certain new and useful Improvements in Feed-Dish Guards, of which the following is a specification.

This invention relates to feeding devices and particularly to a poultry feeder.

In the offering of dry food to fowls much difficulty is experienced on account of the natural instinct when in search of food to scratch wherever the feeding takes place. This instinct to scratch among the feed has proven a difficult matter to overcome and the waste accomplished by this habit has formed a very considerable item in the cost of maintaining poultry.

In order to prevent the scratching out of food and to prevent the waste from the feeding receptacle and the soiling of the food I have devised my present invention.

My invention consists in providing a gravity shield which prevents the fowls from throwing out the food from the receptacle and also includes means which prevents the dislodgment of the gravity shield and the roosting of the fowls on the vessel itself.

The construction and operation of my device will be more fully described in the specification which follows.

In the drawings which form a part of that specification I have shown a form of device which I have found particularly adapted to practical use with poultry. This form I shall particularly describe in the specification, employing throughout specification and drawings like reference numerals to indicate corresponding parts.

Figure 2:
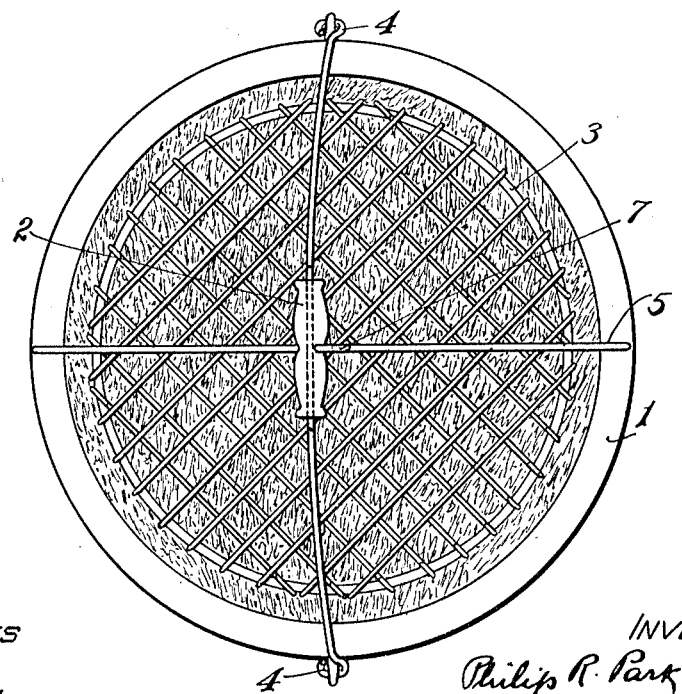

In the drawings:—Figure 1 is a central sectional view of a feed dish equipped with my bail support, and Fig. 2 is a plan view of the dish with the bail support and with the grid shield in place.

The vessel 1 is preferably a comparatively shallow and heavy flat bottom container having a handle 2 pivoted in ears 4. Within the vessel is lodged a shield in the form of a grid 3. This grid is heavy enough to bear down upon the food contained within the vessel, allowing just sufficient to work through the opening so that the fowls may feed through the top of the grid without being able to scratch or otherwise throw about the food within the vessel 1.

I have found that, even though the grid 3 be comparatively heavy, if the vessel is freshly filled with food and the grid 3 is supported near the top of the vessel 1 it is liable to become tilted and dislodged over the edge of the vessel. In order to avoid this I have provided a guard 5 provided with an angular foot 8 and an internal extension 9 adapted to rest respectively on the top and inner edge of the vessel 1. This guard 5 has an upwardly extending loop 7 which increases its resiliency and at the foot of the loop 7 on one side is provided a depression 6 adapted to receive the handle $2^1$ of the bail 2.

It will be seen by reference to Fig. 1 that the bail 2 and the guard 5 form a cage above the vessel 1. This prevents the fowls from roosting on the edge of the vessel or from stepping on to the grid. In addition to this function as a spring loop, the portion 7 prevents the roosting of fowls on the upper portion of the cage.

In shipping, the bail 2 and the guard 5 may be detached and sprung within the vessel 1 so as to make a compact shipping package.

Various modifications in the construction and operation of my device may obviously be made, all without departing from the spirit of my invention if within the limits of the appended claims.

What I, therefore, claim and desire to secure by Letters Patent is:—

1. In combination with a feeding receptacle comprising a shallow open top vessel adapted to hold a body of feed therein, a grid horizontally disposed and loosely fitting within the open top of said vessel and bearing upon and retaining the surface level of the food within the vessel, a bail fastened to said vessel and having a handle, and a removable bail support having edge engaging portions at each end to limit the upward movement of the grid and a central portion adapted for engagement with the handle of said bail.

2. In a device of the class described in combination with a vessel adapted to hold a body of feed therein, a grid loosely fitting